United States Patent
Park et al.

(10) Patent No.: US 10,882,727 B2
(45) Date of Patent: *Jan. 5, 2021

(54) WATER PURIFIER

(71) Applicant: LG ELECTRONICS INC., Seoul (KR)

(72) Inventors: Jongwoo Park, Seoul (KR); Kwangyong An, Seoul (KR); Yongbum Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 28 days.

This patent is subject to a terminal disclaimer.

(21) Appl. No.: 16/349,102

(22) PCT Filed: Nov. 10, 2017

(86) PCT No.: PCT/KR2017/012746
§ 371 (c)(1),
(2) Date: May 10, 2019

(87) PCT Pub. No.: WO2018/088849
PCT Pub. Date: May 17, 2018

(65) Prior Publication Data
US 2019/0276299 A1     Sep. 12, 2019

(30) Foreign Application Priority Data

Nov. 10, 2016 (KR) .................. 10-2016-0149553

(51) Int. Cl.
*B67D 1/08* (2006.01)
*B01D 35/18* (2006.01)
(Continued)

(52) U.S. Cl.
CPC .......... *B67D 1/0859* (2013.01); *B01D 35/18* (2013.01); *B67D 1/08* (2013.01); *B67D 1/12* (2013.01);
(Continued)

(58) Field of Classification Search
CPC .......... B67D 1/0859; B67D 1/08; B67D 1/12; B67D 1/1204; B67D 2210/0001;
(Continued)

(56) References Cited

U.S. PATENT DOCUMENTS

| 3,605,421 A | 9/1971 | Patrick |
| 2004/0011730 A1 | 1/2004 | Powell et al. |
| 2014/0223942 A1* | 8/2014 | Lee .................. F25D 31/002 62/190 |

FOREIGN PATENT DOCUMENTS

| CN | 201010534 | 1/2008 |
| CN | 203163415 | 8/2013 |

(Continued)

OTHER PUBLICATIONS

Chinese Office Action in Chinese Appln. No. 201780068632.3, dated Aug. 5, 2020, 12 pages (with English translation).

(Continued)

*Primary Examiner* — Emmanuel E Duke
(74) *Attorney, Agent, or Firm* — Fish & Richardson P.C.

(57) ABSTRACT

A water purifier includes a cooling water tank, a partition member mounted inside the cooling water tank and partitioning an inner space of the cooling water tank into an upper space and a lower space, a cold water pipe accommodated in the lower space; an evaporator accommodated in the upper space, and an agitator penetrating the partition member and disposed in the lower space. The partition member includes a bottom portion on which the evaporator is mounted and that defines a plurality of cooling water through-holes, and an outer wall portion extending upward along an edge of the bottom portion to define an evaporator accommodating portion. The outer wall portion is spaced apart from an inner wall of the cooling water tank to prevent (Continued)

ice formed in the evaporator accommodating portion from contacting the inner wall of the cooling water tank.

15 Claims, 14 Drawing Sheets

(51) Int. Cl.
    *B67D 1/12* (2006.01)
    *C02F 1/00* (2006.01)
    *F25D 23/00* (2006.01)
    *F25D 31/00* (2006.01)
    *F25D 23/06* (2006.01)
    *C02F 1/28* (2006.01)
    *C02F 1/44* (2006.01)

(52) U.S. Cl.
    CPC .......... *B67D 1/1204* (2013.01); *C02F 1/001* (2013.01); *F25D 23/00* (2013.01); *F25D 23/06* (2013.01); *F25D 31/00* (2013.01); *B67D 2210/0001* (2013.01); *B67D 2210/00028* (2013.01); *B67D 2210/00057* (2013.01); *B67D 2210/00149* (2013.01); *C02F 1/283* (2013.01); *C02F 1/444* (2013.01); *C02F 2307/10* (2013.01)

(58) Field of Classification Search
    CPC ........... B67D 2210/00028; B67D 2210/00057; B67D 2210/00149; B67D 1/0895; B67D 1/0014; B67D 1/0864; B01D 35/18; C02F 1/001; C02F 1/283; C02F 1/444; C02F 2307/10; F28F 9/0131; F28F 2265/14; F28F 2225/04; F28F 2240/00; F28D 20/021; F28D 2021/0042; F28D 1/0472; F25D 23/006; F25D 31/003; F25D 23/00; F25D 31/00; F25D 23/06
    See application file for complete search history.

(56) References Cited

FOREIGN PATENT DOCUMENTS

| | | |
|---|---|---|
| CN | 103479220 | 1/2014 |
| CN | 204434380 | 7/2015 |
| GB | 2059038 | 4/1981 |
| JP | 3234346 B2 | 12/2001 |
| JP | 2003-192097 A | 7/2003 |
| KR | 10-2010-0078802 A | 7/2010 |
| KR | 20110065979 | 6/2011 |
| KR | 10-1191420 B1 | 10/2012 |
| KR | 10-2013-0035888 A | 4/2013 |
| KR | 20140072678 | 6/2014 |
| KR | 20150114161 | 10/2015 |
| KR | 10-2016-0055471 A | 5/2016 |

OTHER PUBLICATIONS

Extended European Search Report in European Appln. No. 17868983.2, dated Jul. 30, 2020, 10 pages.

* cited by examiner

WATER PURIFIER

CROSS-REFERENCE TO RELATED APPLICATIONS

This application is a National Stage application under 35 U.S.C. § 371 of International Application No. PCT/KR2017/012746, filed on Nov. 10, 2017, which claims the benefit of Korean Patent Application No. 10-2016-0149553, filed on Nov. 10, 2016. The disclosures of the prior applications are incorporated by reference in their entirety.

TECHNICAL FIELD

The present invention relates to a water purifier.

BACKGROUND ART

A water purifier is a device that filters harmful elements such as foreign substances or heavy metals contained in water by physical and/or chemical methods.

A water purifier equipped with a cold water generating unit having a structure similar to that of the purifier of the present invention is disclosed in FIG. 4 of Korean Patent Application Publication No. 10-2016-0055471 (May 18, 2016) filed and published by the applicant of the present invention.

The conventional water purifier disclosed in the prior art, that is, the direct-type water purifier, has a structure in which a cold water pipe and an evaporator for cooling cooling water are immersed in the cooling water. Therefore, when a refrigerant flows into the evaporator so as to generate cold water, a part of the cooling water is frozen around the evaporator to generate ice. An agitator operates to promote heat exchange between the cooling water and the cold water flowing along the cold water pipe. When the agitator operates, the temperature of the cooling water is uniformly maintained.

Meanwhile, since the refrigerant flowing along the evaporator is maintained at about minus 18° C., ice can be formed on the surface of the evaporator and the periphery of the evaporator. The ice may be attached to the surface of the evaporator, and may be separated from the surface of the evaporator by the flow of cooling water according to the operation of the agitator.

DISCLOSURE OF THE INVENTION

Technical Problem

In the conventional water purifier disclosed in the prior art, since the evaporator and the cooling water pipe are not spatially partitioned, there is a problem that ice floating near the evaporator collides with the agitator to generate noise.

In addition, the ice pieces irregularly moving with the cooling water by the agitator may hit the agitator and the cold water pipe to damage the agitator and the cold water pipe or to deform the shape of the cold water pipe.

Meanwhile, in the case where the water purifier is installed in a place where the cold water dispensing frequency is high, the temperature of the cold water increases without being maintained at a set temperature as the amount of cold water dispensed increases, resulting in inconvenience in use.

Therefore, in order to increase the amount of the cold water dispensed while maintaining the set temperature at one time or for a unit time, the cooling power of the evaporator may be increased to increase the amount of ice formed on the surface of the evaporator.

However, as the volume of the ice formed on the surface of the evaporator increases, ice may stick to the surface of the cooling water storage container. As a result, dew may form on the outer surface of the cooling water storage container.

In addition, the formed ice may be attached to the surface of the cold water pipe extending to the inside of the cooling water storage container, and the cold water flowing along the cold water pipe may freeze, thus causing problems in the dispensing of the cold water.

The present invention is proposed to improve the above-described problems.

Technical Solution

In order to achieve the above object, a water purifier according to an embodiment of the present invention includes: a cooling water tank storing cooling water; a partition member mounted inside the cooling water tank and partitioning an inner space of the cooling water tank into an upper space and a lower space; a cold water pipe which is accommodated in the lower space and through which edible water flows; an evaporator which is accommodated in the upper space and through which a refrigerant flows; and an agitator penetrating the partition member and disposed in the lower space so as to stir the cooling water, wherein the partition member includes: a bottom portion on which the evaporator is mounted, the bottom portion having a plurality of cooling water through-holes formed therein; and an outer wall portion extending upward along an edge of the bottom portion to form an evaporator accommodating portion, wherein the outer wall portion is spaced apart from an inner wall of the cooling water tank so as to prevent ice formed in the evaporator accommodating portion from being in contact with the inner wall of the cooling water tank.

In addition, the outer wall portion is spaced from the inner wall of the cooling water tank by a mounting guide protruding from the outer circumferential surface of the outer wall.

In addition, a portion of the outer wall portion is formed to be stepped such that the inlet and outlet ends of the cold water pipe are allowed to pass, and the cold water pipe is prevented from contacting the ice formed in the partition member.

In addition, the inner wall portion extends from the bottom portion, and the inner wall portion is formed to be higher than the outer wall portion, thereby preventing the ice formed in the partition member from riding over the inner wall portion and flowing into the lower space.

In addition, the cooling water is filled up to a height between the upper end of the outer wall portion and the upper end of the inner wall portion. As a result, when the agitator rotates, the cooling water in the lower space rises over a spacing space formed between the outer wall portion and the inner wall of the cooling water tank, such that the cooling water rides over the outer wall portion to flow into the upper space.

Advantageous Effects

The water purifier configured as described above according to the embodiment of the present invention has the following effects.

First, since the space where the evaporator pipe is placed and the space where the cold water pipe is placed are separated by the partition member, the cooling water is freely moved and mixed into the two spaces, whereas the ice formed near the evaporator is present only in the space where the evaporator pipe is placed. Therefore, the phenomenon that the ice hits the agitator or the cold water pipe is blocked, and no impact noise is generated.

Second, since the ice formed near the evaporator does not hit the agitator or the cold water pipe, the agitator and the cold water pipe are prevented from being damaged.

Third, since the partition member having the outer wall according to the embodiment of the present invention prevents the ice formed on the surface of the evaporator from contacting the inner surface of the cooling water tank, it is possible to prevent the phenomenon that dew is formed on the outer surface of the water purifier.

In addition, the partition member having the outer wall according to the embodiment of the present invention prevents the ice formed on the surface of the evaporator from sticking to the surface of the cold water pipe. Therefore, it is possible to prevent the phenomenon that the cold water pipe is frozen and the cold water cannot be smoothly dispensed.

MODE FOR INVENTION

Hereinafter, a water purifier according to an embodiment of the present invention will be described in detail with reference to the accompanying drawings.

Figure 1:
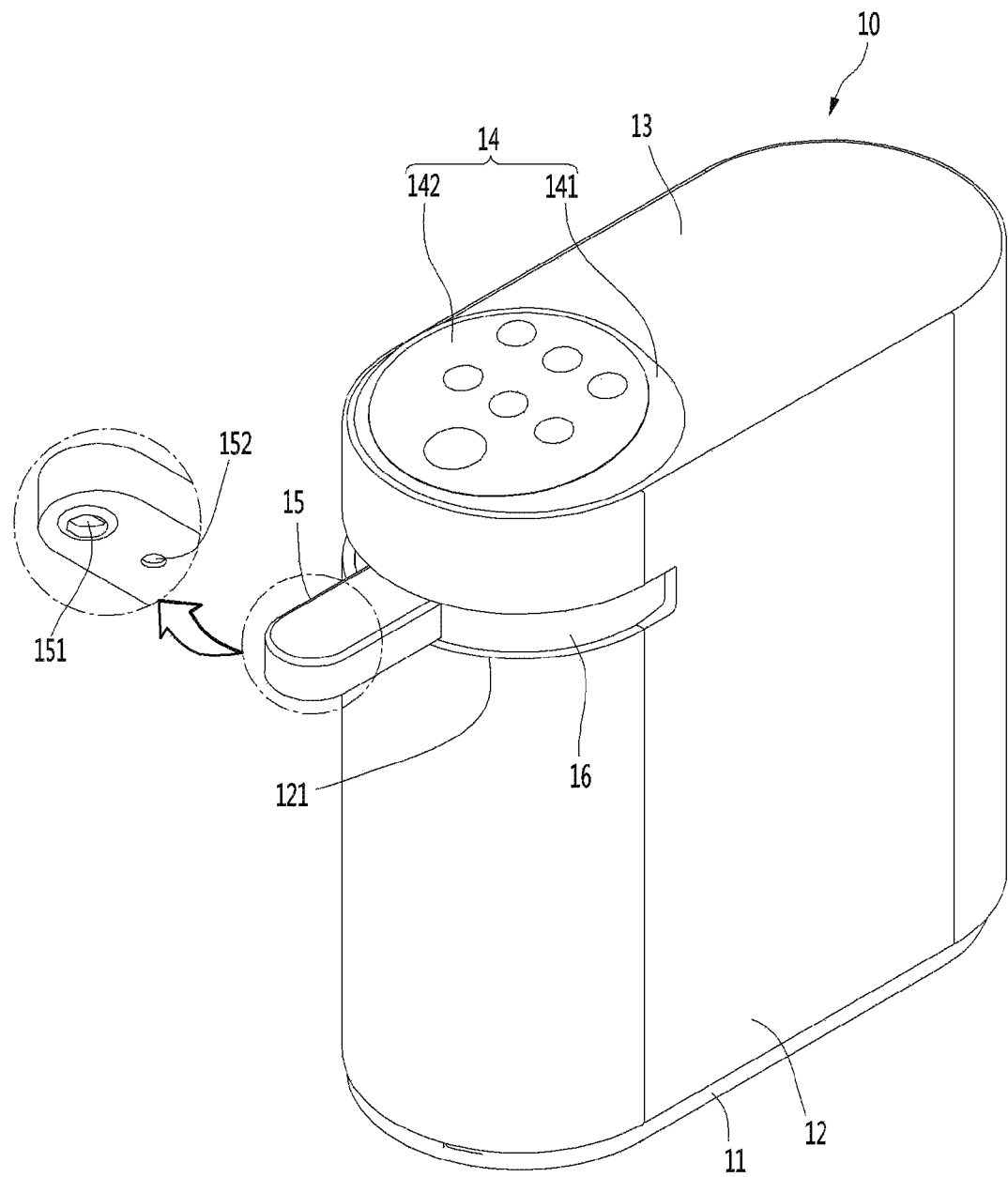
FIG. 1 is a front perspective view of a water purifier according to an embodiment of the present invention.
Figure 2:
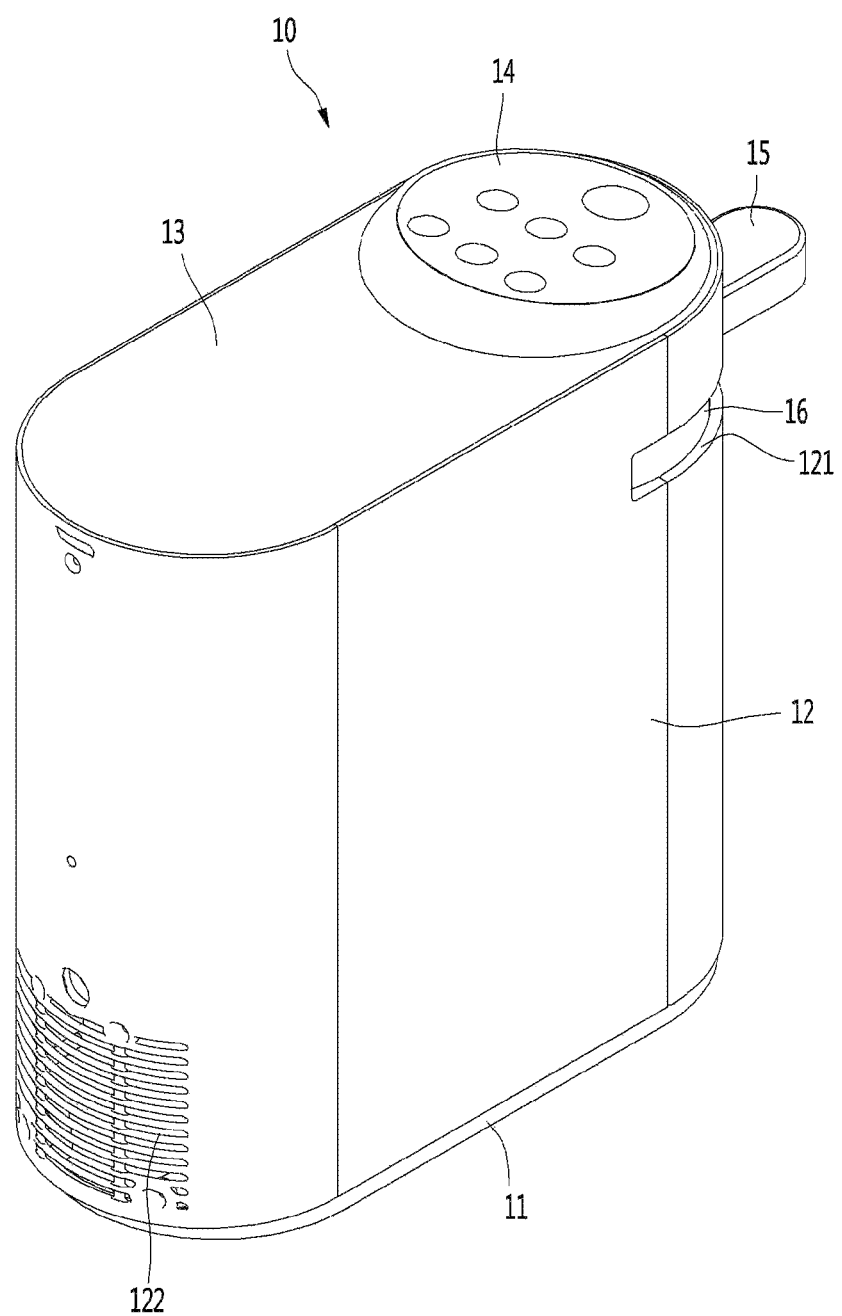
FIG. 2 is a rear perspective view of the water purifier.

FIG. 1 is a front perspective view of a water purifier according to an embodiment of the present invention, and FIG. 2 is a rear perspective view of the water purifier.

Referring to FIGS. 1 and 2, the water purifier 10 according to an embodiment of the present invention is a direct type cold/hot water purifier for cooling or heating water supplied directly from an external water source and dispensing the water.

In detail, the water purifier 10 may include at least part or all of: a base 11 constituting a bottom portion, a housing 12 disposed on the edge of the upper surface of the base 11, a cover 13 covering the opened upper surface of the housing 12, a control panel 14 formed on the upper surface of the cover 13, and a water chute 15 protruding from the outer circumferential surface of the housing 12.

In more detail, a portion where the water chute 15 is formed may be defined as the front surface of the water purifier 10, and an opposite surface thereof may be defined as the rear surface. A discharge grille 122 is formed at the bottom of the rear surface of the housing 12 such that air heat-exchanged with a condenser to be described later is discharged to the outside of the housing 12.

In addition, the control panel 14 may be formed at a position close to the front end of the water purifier 10 and may be formed at a position close to the center or rear end of the water purifier 10 according to design conditions. The control panel 14 may be formed to be inclined in such a manner that a rear is higher than a front end, such that the control panel 14 can be easily recognized by the user who is in front of the water chute 15.

Figure 3:
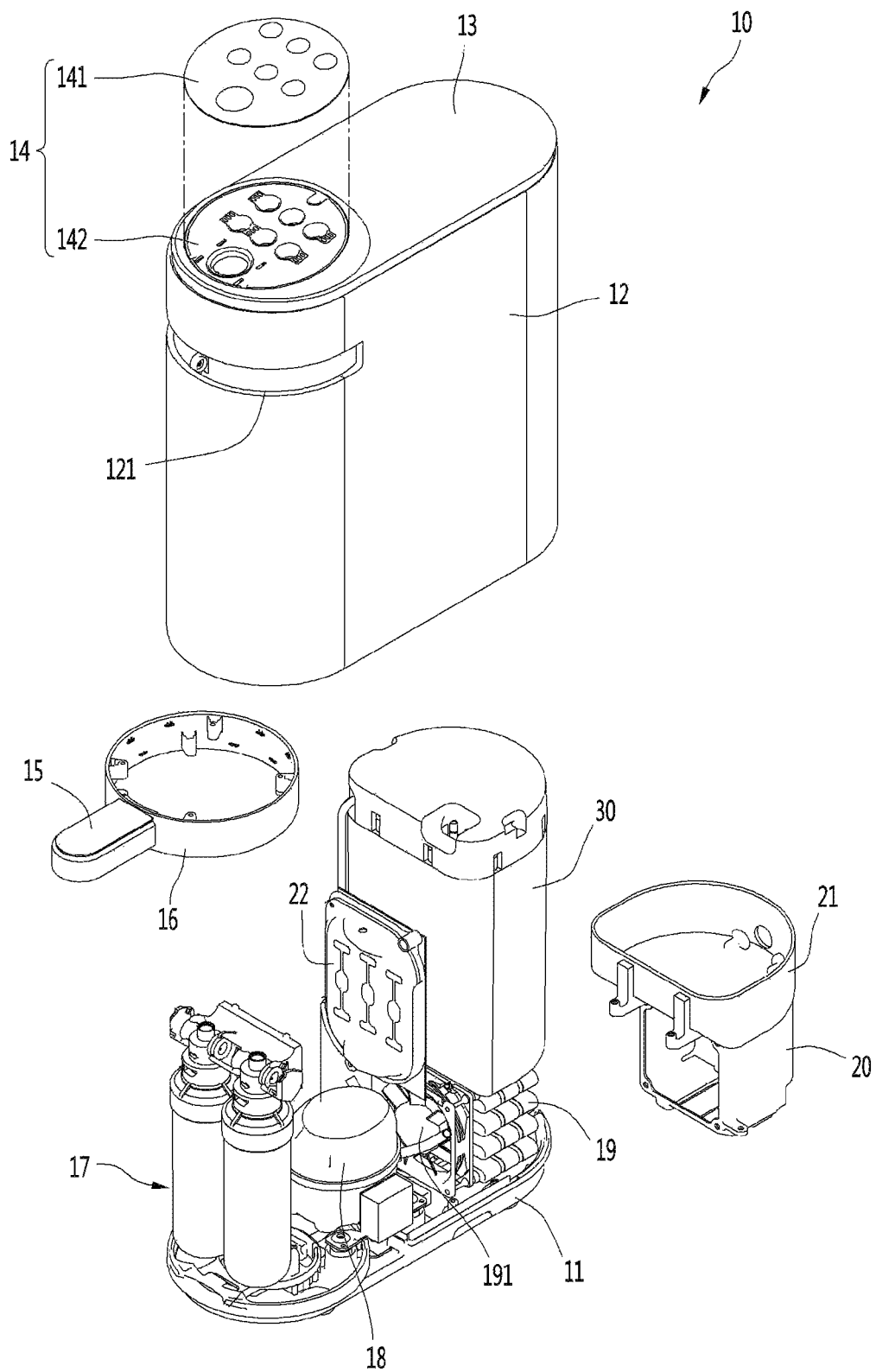
FIG. 3 is an exploded perspective view showing the internal configuration of the water purifier according to the embodiment of the present invention.

In detail, the control panel 14 may include a panel main body 141 having the rear end protruding higher than the front end from the upper surface of the water purifier 10, and a panel cover 142 covering the upper surface of the panel main body 141. As shown in FIG. 3, the panel main body 141 may have holes or grooves for mounting a plurality of button portions, and the buttons may be mounted on the holes or grooves, respectively. Button menus corresponding to the buttons may be printed on the panel cover 142.

The buttons provided on the control panel 14 may include a power button, a water dispensing button, a button for selecting a type of water to be dispensed, a button for setting a temperature of water, and a button for setting an amount of water to be dispensed. Picture or text information indicating the buttons may be printed on the panel cover 142. The type of the water dispensed may include purified water, cold water, hot water, mineral water, and the like.

In addition, the water chute 15 may extend a predetermined length forward of the water purifier 10 along a line connecting the center of the front end of the water purifier 10 and the center of the rear end of the water purifier 10, and can be mounted rotatably within a range of 90 degrees from the center of the front end of the water purifier 10 to the right and left sides thereof. That is, the water chute 15 can rotate 180 degrees in total.

In addition, a rotation guide 16 having a circular strip shape may be mounted on the rear end of the water chute 15 such that the water chute 15 can rotate. The water chute 15 and the rotation guide 16 may be injection-molded into one body, or may be formed as separate parts and bonded together by a fastening member.

In addition, a guide hole 121 for guiding the rotation of the water chute 15 may be formed on the front surface of the housing 12. The water chute 15 is rotatable 90 degrees to the left and right along the guide hole 121.

In addition, a dispensing port 151 for dispensing water is formed at the bottom surface of the water chute 15. One or more dispensing ports 151 may be formed. When a single dispensing port 151 is formed, a flow path may be formed such that cold water, purified water, and hot water are discharged through one dispensing port. Meanwhile, although not shown, a plurality of dispensing ports 151 may be arranged in a line in the front-rear direction such that cold water, purified water, and hot water are dispensed to separate dispensing ports.

In addition, a sensor 152 may be mounted on the bottom surface of the water chute 15 such that water can be dispensed when the user places a storage container such as a cup below the water chute 15. Therefore, even when a water dispensing command is input by pressing a water dispensing button provided on the control panel 14, it is possible to prevent water from being dispensed from the dispensing port 151 before the cup is placed below the water chute 15.

FIG. 3 is an exploded perspective view showing the internal configuration of the water purifier according to the embodiment of the present invention.

Referring to FIG. 3, a refrigerant cycle for cooling water and a plurality of elements including a cold water generating unit 30 for generating cold water are accommodated inside the housing 12 forming the appearance of the water purifier 10 according to the embodiment of the present invention.

In detail, the water purifier 10 may include at least part or all of a compressor 18 disposed on one side of the upper surface of the base 11 to compress the refrigerant into a high-temperature high-pressure gaseous refrigerant, a condenser 19 disposed on the rear side of the base 11 to condense the refrigerant discharged from the compressor 18 into a high-temperature high-pressure liquid refrigerant, and a condensing fan 191 suctioning air of the room where the water purifier 10 is placed and performing heat exchange with the condenser 19.

In addition, the water purifier 10 may further include a filter assembly 17 filtering foreign substances contained in water supplied from the water supply source. The filter assembly 17 may be positioned on the front end side of the base 11. The filter assembly 17 may include one or both of a pre-carbon filter and an ultra filtration filter.

In addition, the water purifier 10 may further include an expansion valve (not shown) expanding the refrigerant discharged from the condenser 19 into a low-temperature low-pressure two-phase refrigerant, and an evaporator (not shown) through which the low-temperature low-pressure two-phase refrigerant having passed through the expansion value flows.

In detail, the water purifier 10 may further include a cold water generating unit 30 including the evaporator and a cold water pipe (described later) through which cold water flows, and the cold water generating unit 30 may be disposed above the condenser 19, but is not limited thereto.

In addition, the water purifier 10 may further include a guide duct 20 surrounding the condenser, and a tank support portion 21 supporting the bottom surface of the cold water generating unit 30. The tank support portion 21 and the guide duct 20 may be plastic-injection-molded as one body, or may be provided as separate articles and bonded together by a fastening member.

In addition, the water purifier 10 may further include a hot water heater 22 heating the water to be supplied to a set temperature. A hot water flow path extending toward the hot water heater 22 and a cold water flow path extending toward the cold water generating unit 30 may be respectively branched from a water pipe connected to the outlet side of the filter 17.

Therefore, when a hot water dispensing command is input, the water passing through the hot water heater 22 is dispensed, and when a cold water dispensing command is input, the water passing through the cold water generating unit 30 is dispensed. When a room-temperature purified water dispensing command is input, water flowing along a water pipe extending from the outlet side of the filter 17 is dispensed.

Figure 4:
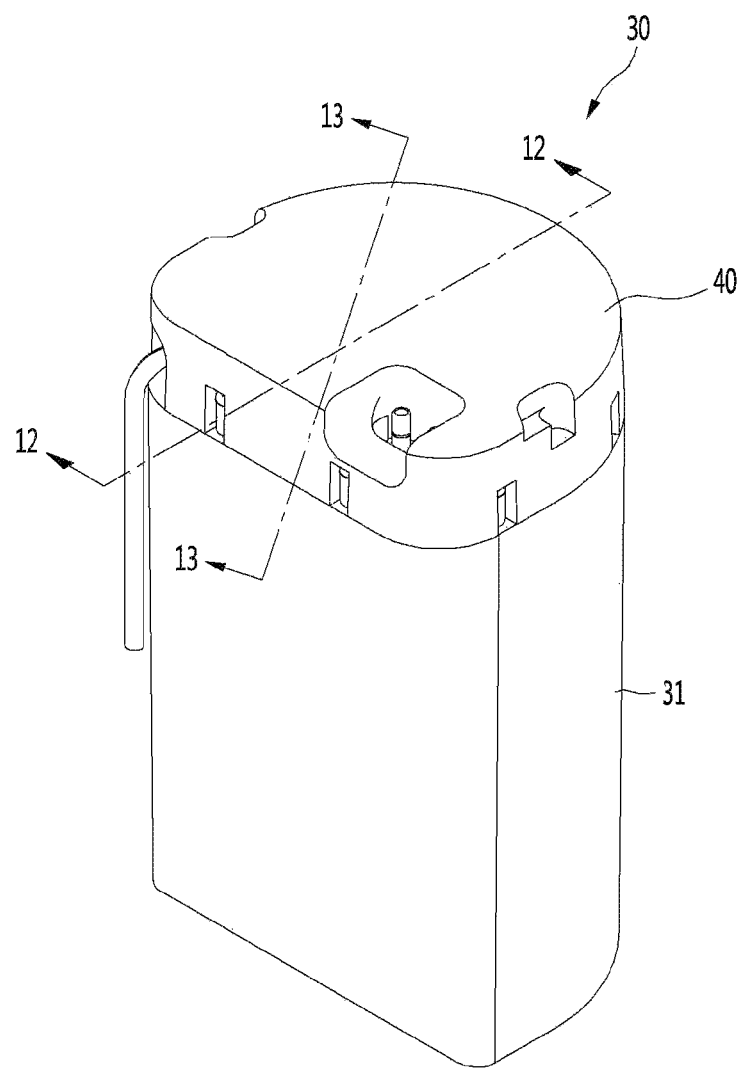
FIG. 4 is an external perspective view of a cold water generating unit mounted on the water purifier according to the embodiment of the present invention.
Figure 5:
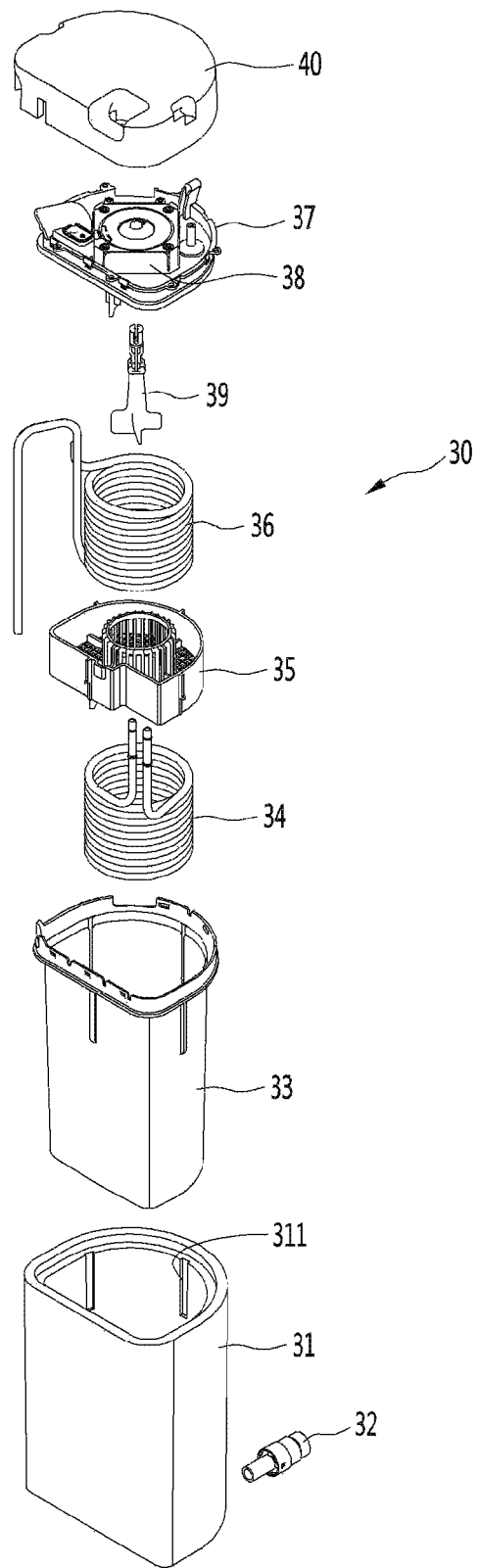
FIG. 5 is an exploded perspective view of the cold water generating unit.

FIG. 4 is an external perspective view of a cold water generating unit mounted on the water purifier according to the embodiment of the present invention, and FIG. 5 is an exploded perspective view of the cold water generating unit.

Referring to FIGS. 4 and 5, the cold water generating unit 30 according to the embodiment of the present invention may include a cooling water tank 33 filled with cooling water, an insulation case 31 accommodating the cooling water tank 33 such that the cooling water tank 33 is insulated from indoor air, a cooling water valve 32 passing through the insulation case 31 and communicating with the inner space of the cooling water tank 33, a cold water pipe 34 accommodated in the cooling water tank 33, a partition member 35 disposed above the cold water pipe 34 to partition the inner space of the cooling water tank 33 into an upper space and a lower space (or a first space and a second space), an evaporator 36 seated on the partition member 35, a tank cover 37 covering the upper surface of the cooling water tank 33, an agitator motor 38 fixed to the inside of the tank cover 37 and having a rotational shaft extending toward a bottom side of the cooling water tank 33, an agitator 39 accommodated in the cooling water tank 33 and connected to the rotational shaft of the agitator motor 38, and an insulation cover 40 covering the tank cover 37 and seated on the upper surface of the insulation case 31. The agitator 39 may extend downward and may be placed in the lower space (the second space) of the cooling water tank 33 defined below the partition member 35.

In detail, the cooling water may be introduced into the cooling water tank 33 through the cooling water valve 32, and the cooling water valve 32 may be opened to drain the cooling water filled in the cooling water tank 33. That is, the cooling water valve 32 may be a valve serving as both a cooling water supply function and a cooling water discharge function. Alternatively, the cooling water valve 32 functions only as a drain valve, and a cooling water injection port or a cooling water injection valve may be additionally mounted on the tank cover 37.

Meanwhile, a plurality of mounting guide grooves 311 may be formed on the inner circumferential surface of the insulation case 31 by a predetermined length in the vertical direction. The plurality of mounting guide grooves 311 may be spaced apart from each other in the circumferential direction of the insulation case 31.

The cooling water tank 33 is accommodated in the insulation case 31, and the cold water pipe 34 is accommodated in the cooling water tank 33. The partition member 35 is accommodated in the cooling water tank 33 to divide the inner space of the cooling water tank 33 into an upper space and a lower space.

In addition, the evaporator 36 is seated inside the partition member 35, and ice is formed in the space where the evaporator 36 is accommodated. When the tank cover 37 is seated on the upper surface of the cooling water tank 33, the agitator 39 connected to the rotational shaft of the agitator motor 38 passes through the partition member 35 and is introduced into the space where the cold water pipe 34 is accommodated. When the insulation cover 40 covers the tank cover 37 and is seated on the upper surface of the insulation case 31, the cooling water tank 33 is insulated from the outside of the insulation case 31.

Hereinafter, the structure and function of the partition member 35 will be described in detail with reference to the accompanying drawings.

Figure 6:
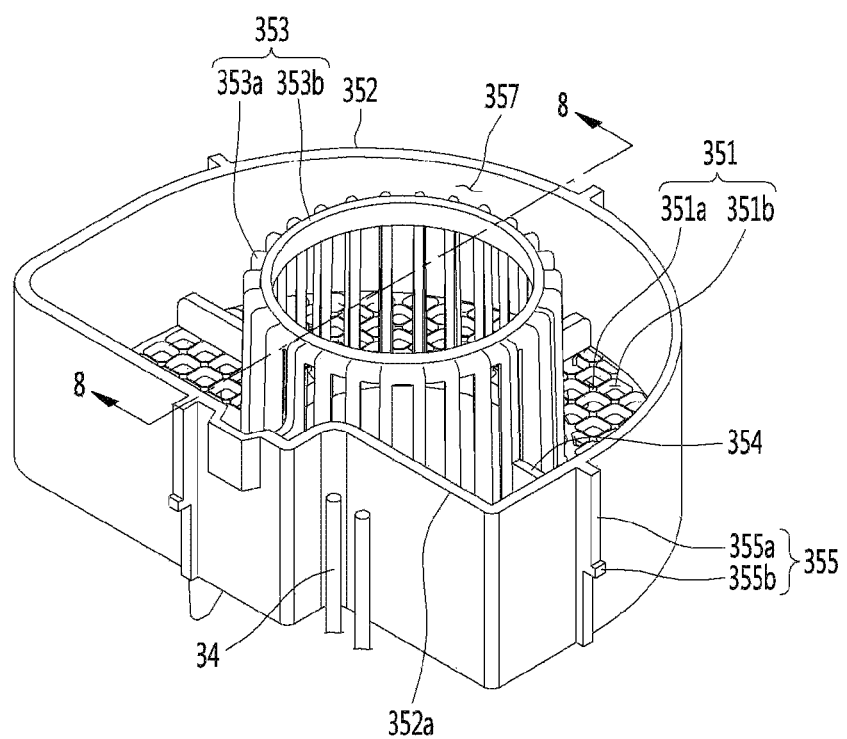
FIG. 6 is a top perspective view of a partition member constituting the cold water generating unit according to an embodiment of the present invention.
Figure 7:
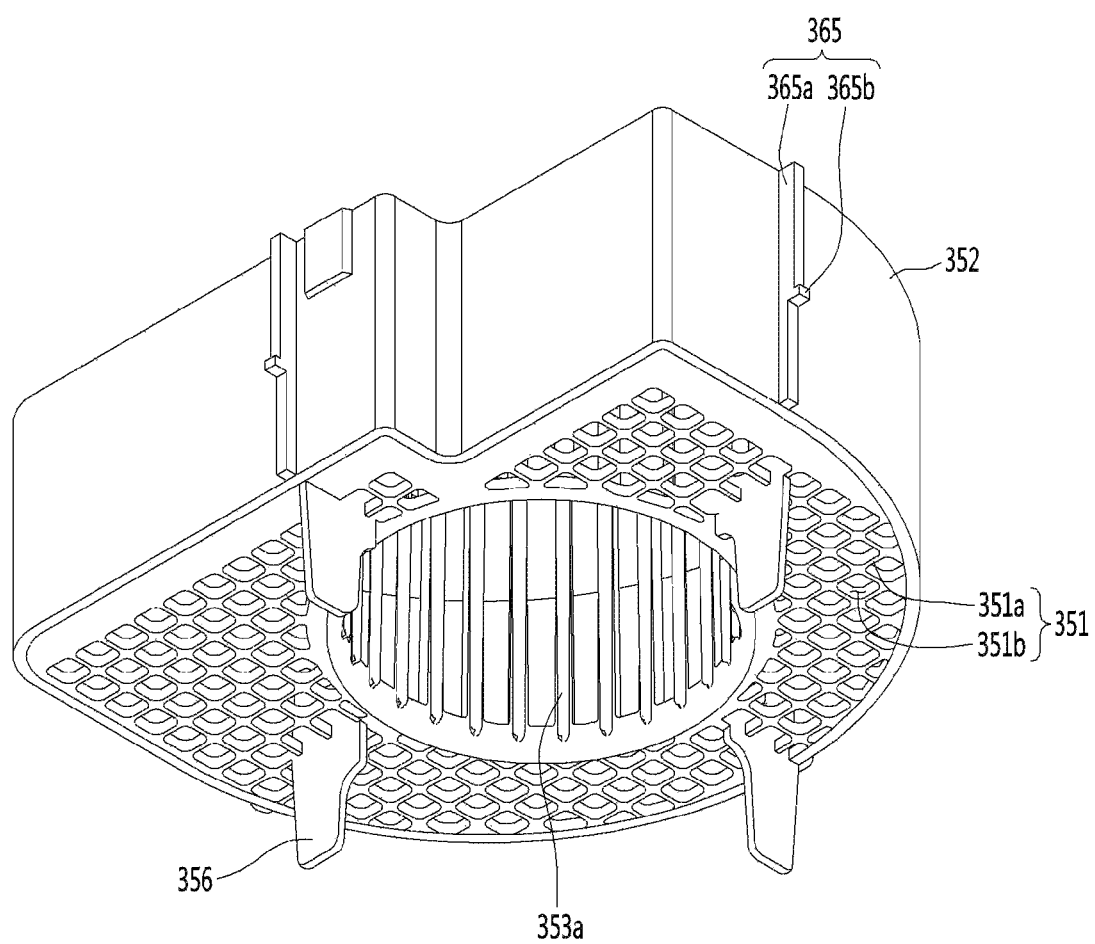
FIG. 7 is a bottom perspective view of the partition member.
Figure 8:
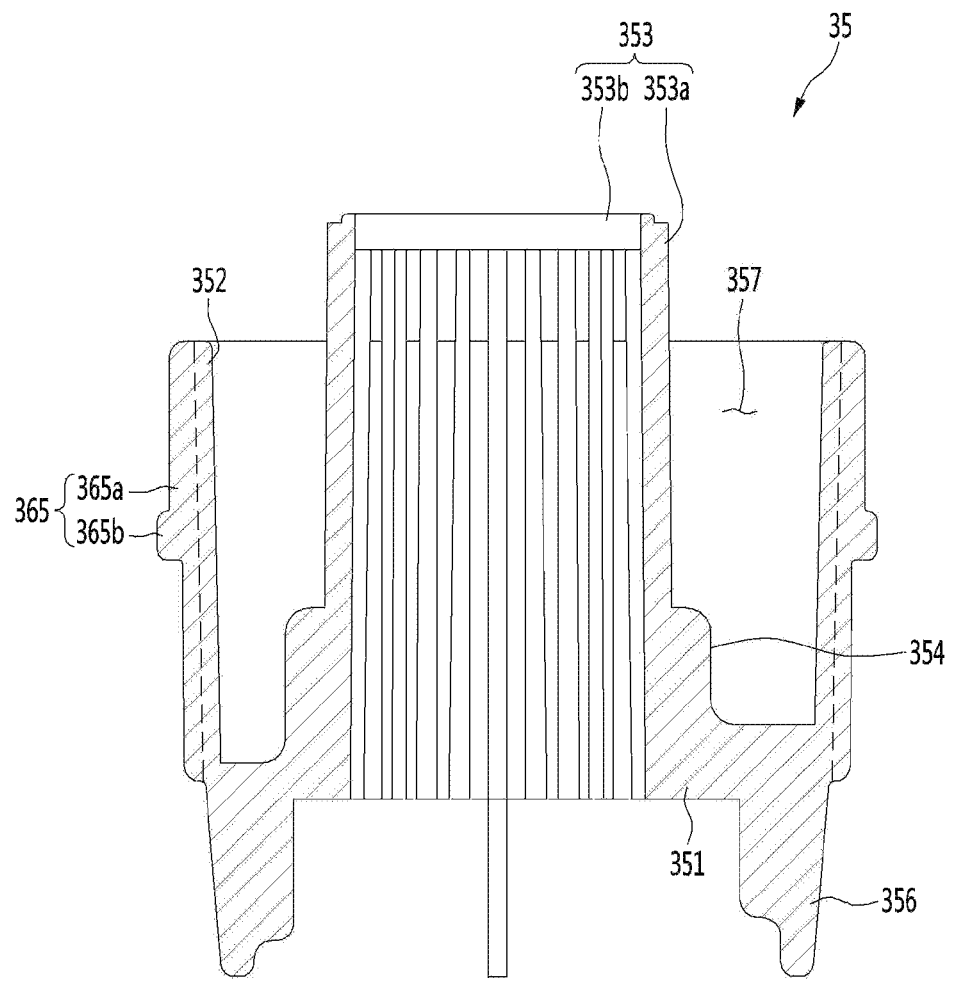
FIG. 8 is a longitudinal sectional view of the partition member cut along line 8-8 of FIG. 6.

FIG. 6 is a top perspective view of the partition member constituting the cold water generating unit according to an embodiment of the present invention, FIG. 7 is a bottom perspective view of the partition member, and FIG. 8 is a longitudinal sectional view of the partition member cut along line 8-8 of FIG. 6.

Referring to FIGS. 6 to 8, the partition member 35 according to the embodiment of the present invention may include a bottom portion 351, an outer wall portion 352 extending upward from the outer edge of the bottom portion 351, and an inner wall portion 353 extending upward from the center of the bottom portion 351.

In detail, the bottom portion 351 includes a plurality of grid ribs 351a extending to intersect in the horizontal direction and the vertical direction, and a cooling water through-hole 351b formed between the grid ribs 351a. Therefore, the cooling water can pass between the upper space and the lower side space of the bottom portion 351 through the cooling water through-hole 351b.

In addition, a circular hole may be formed inside the bottom portion 351, and the inner wall portion 353 may extend upward from the edge of the circular hole. In detail, the inner wall portion 353 may include a plurality of vertical ribs 353a extending upward from the edge of the circular hole, and a circular strip-shaped upper rib 353b connecting the plurality of vertical ribs 353a. The hole formed inside the bottom portion 351 may be defined as an agitator throughhole, and the hole may have a polygonal shape as well as a circular shape. Then, the inner wall portion or the cross section may be a circular or polygonal tubular shape.

In more detail, the plurality of vertical ribs 353a may be spaced a predetermined distance in the circumferential direction of the circular hole to form a cylindrical shape. Alternatively, the plurality of vertical ribs 353a may extend obliquely to form a truncated conical shape having a cross section whose diameter decreases toward the upper side. A plurality of ribs having a circular strip shape like the upper ribs 353b may be spaced apart in the vertical direction such that the inner wall portion 353 also has a grid shape.

Unlike the bottom portion 351 or the inner wall portion 353, the outer wall portion 352 may be constituted by a shield wall having no holes through which cooling water or air can pass. That is, the inner space and the outer space of the partition member 35 may be partitioned with respect to the outer wall portion 352.

A plurality of mounting guides 355 may protrude from the outer circumferential surface of the outer wall portion 352. In detail, the plurality of mounting guides 355 may be provided with an even number of mounting guides and formed at positions facing each other, or may be provided with an odd number of mounting guides and formed at positions where the mounting guides form the same distance. However, it should be noted that the positions and number of the mounting guides 355 are not limited to the proposed embodiments.

The mounting guide 355 may include a spacing rib 355a protruding from the outer circumferential surface of the outer wall portion 352, and a fixing rib 355b further extending from the end of the spacing rib 355a.

The spacing rib 355a may protrude from the outer circumferential surface of the outer wall portion 352 by a predetermined length in the horizontal direction, and may extend from the upper end to the lower end of the outer wall portion 352. When the partition member 35 is mounted inside the cooling water tank 33, the end of the spacing rib 355a is in contact with the inner circumferential surface of the cooling water tank 33. Therefore, the outer wall portion 352 is spaced apart from the inner circumferential surface of the cooling water tank 33 by the protruding length of the spacing rib 355a.

The fixing rib 355b is inserted into the inner wall of the cooling water tank 33 such that the partition member 355 is fixed to approximately the middle portion of the cooling water tank 33.

In addition, a stepped portion 352a may be formed on one side of the outer wall portion 352. The stepped portion 352a is formed in such a manner that a portion of the outer wall portion 352 is recessed or stepped toward the inner wall portion 353.

Therefore, when the partition member 35 is mounted inside the cooling water tank 33, an empty space is formed between the outer wall portion 352 defining the stepped portion 352a and the inner wall of the cooling water tank 33, and an inflow end portion and a discharge end portion of the cold water pipe 34 are disposed in the empty space.

Since the inflow end portion and the discharge end portion of the cold water pipe 34 are separated from the partition member 35 by the stepped portion 352a, it is possible to prevent the ice formed inside the partition member 35 from contacting the inflow end portion and the discharge end portion of the cold water pipe 34. As a result, it is possible to prevent the freezing of the cold water flowing along the cold water pipe 34.

Meanwhile, the space formed by the outer wall portion 352, the inner wall portion 353, and the bottom portion 351 may be defined as an evaporator accommodation portion 357 or an ice forming space.

A plurality of evaporator support ribs 354 may be formed on the bottom portion 351 in a stepped shape to support the lower end of the evaporator 36. Since each of the evaporator support ribs 354 has the stepped shape as shown, the evaporator 36 may be mounted inside the partition member 35 in a state of being spaced apart from the inner wall portion 353 and the bottom portion 351.

When the compressor 16 is driven to operate a refrigeration cycle, the refrigerant passing through the evaporator 36 and the cooling water stored in the cooling water tank 33 exchange heat with each other, and ice is formed on the surface of the evaporator 36. The ice formed on the surface of the evaporator 36 may be grown to fill the evaporator accommodation portion 357.

Since the evaporator 36 is formed in a cylindrical shape by being spirally wound as shown, the formed ice can also be formed in a cylindrical tube shape. Even when the ice formed in the evaporator accommodation portion 357 is grown and becomes bulky, lateral growth of ice is restricted by the outer wall portion 352.

Since the outer wall portion 352 is spaced from the inner circumferential surface of the cooling water tank 33, the phenomenon of direct contact with the inner circumferential surface of the cooling water tank 33 during the ice growing process does not occur. Therefore, since the surface of the cooling water tank 33 corresponding to the position of the partition member 35 is not excessively cooled, it is possible to prevent dew from being formed on the outer surface of the insulation case 31.

For this reason, unlike the inner wall portion 353 or the bottom portion 351 in which a plurality of openings are formed, the outer wall portion 352 is constituted by a continuous surface having no holes or slits through which cooling water can pass. That is, the outer wall portion 352 functions as a blocking wall for preventing ice from growing in the lateral direction and preventing the ice from contacting the inner wall of the cooling water tank 33.

Meanwhile, a plurality of cold water pipe support ribs 356 may extend from the bottom surface of the bottom portion 351, and the plurality of cold water pipe support ribs 356 may extend directly below the plurality of evaporator support ribs 354. However, the present invention is not necessarily limited thereto, and the plurality of cold water pipe support ribs 356 may be formed at the corresponding positions between the adjacent evaporator support ribs 354.

Figure 9:
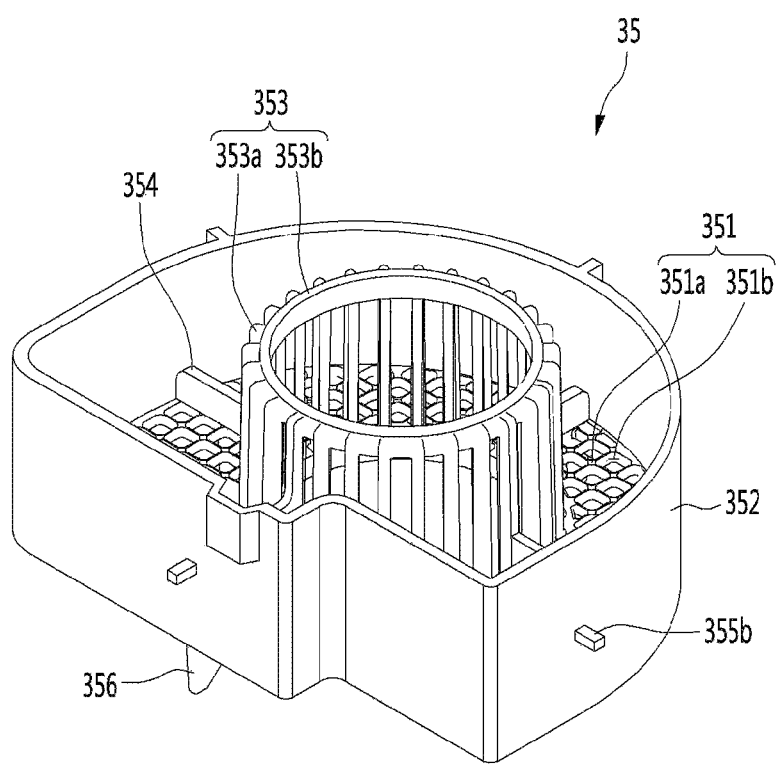
FIG. 9 is a perspective view of a partition member according to another embodiment of the present invention.

FIG. 9 is a perspective view of a partition member according to another embodiment of the present invention.

Referring to FIG. 9, the partition member 35 according to the present embodiment has the same configuration as the partition member 35 shown in FIGS. 6 to 8, except for the shape of the mounting guide 355.

That is, only the fixing rib 355b protrudes from the outer circumferential surface of the outer wall portion 352, and the spacing rib 355a may be removed. Since the spacing rib 355a is removed, the space between the outer wall portion 352 and the cooling water tank 33 is not partitioned by the spacing rib 355a.

Figure 10:
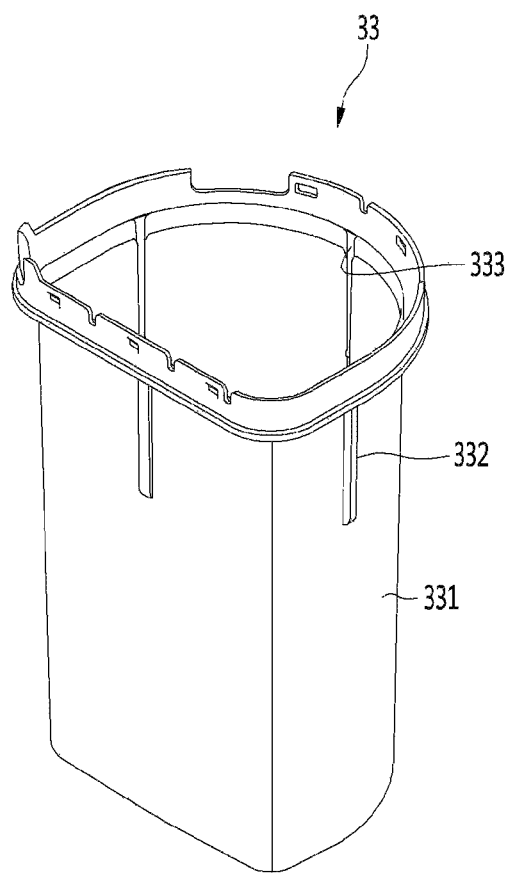
FIG. 10 is a perspective view of a cooling water tank constituting a cold water generating unit according to an embodiment of the present invention.
Figure 11:
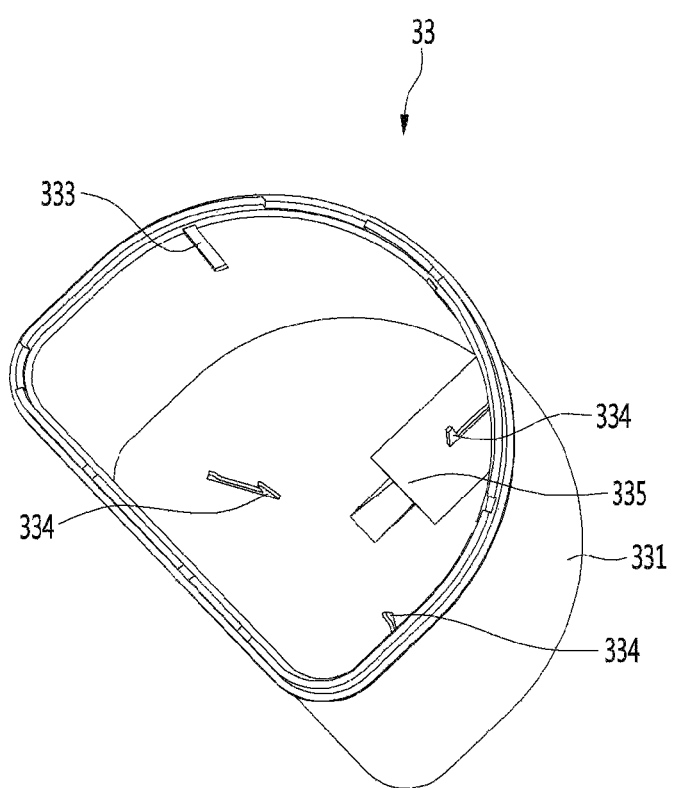
FIG. 11 is a perspective view showing the inside of the cooling water tank.

FIG. 10 is a perspective view of a cooling water tank constituting a cold water generating unit according to an embodiment of the present invention, and FIG. 11 is a perspective view showing the inside of the cooling water tank.

Referring to FIGS. 10 and 11, the cooling water tank 33 according to the embodiment of the present invention may include a tank body 331, a guide protrusion 332 protruding from the outer surface of the tank body 331 and extending downward by a predetermined length, a plurality of cold water pipe support ribs 334 protruding from the bottom surface of the tank body 331 to support the bottom surface of the cold water pipe 34, and a cooling water valve accommodation portion 335 protruded from the bottom of the tank body 331 to accommodate the cooling water valve 32.

The guide protrusion 332 is bent many times so as to form a fitting groove 333 on the inner circumferential surface of the tank body 331. A fixing rib 355b constituting the mounting guide 355 is inserted into the fitting groove 333. The guide protrusion 332 may be fitted in the mounting guide groove 311 formed on the inner circumferential surface of the insulation case 3.

When the partition member 35 is mounted inside the cooling water tank 33, the fixing rib 355b is lowered along the fitting groove 333 and caught by the lower end of the fitting groove 333. The partition member 35 is fixed at a position spaced upward from the bottom portion of the cooling water tank 33 by a predetermined length, and the inner space of the cooling water tank 33 is partitioned into an upper space (first space) and a lower space (second space) with respect to the bottom portion 351 of the partition member 35. However, the cooling water stored in the cooling water tank 33 can freely pass between the upper space and the lower space through the cold water through-holes 351b of the bottom portion 351.

Figure 12:
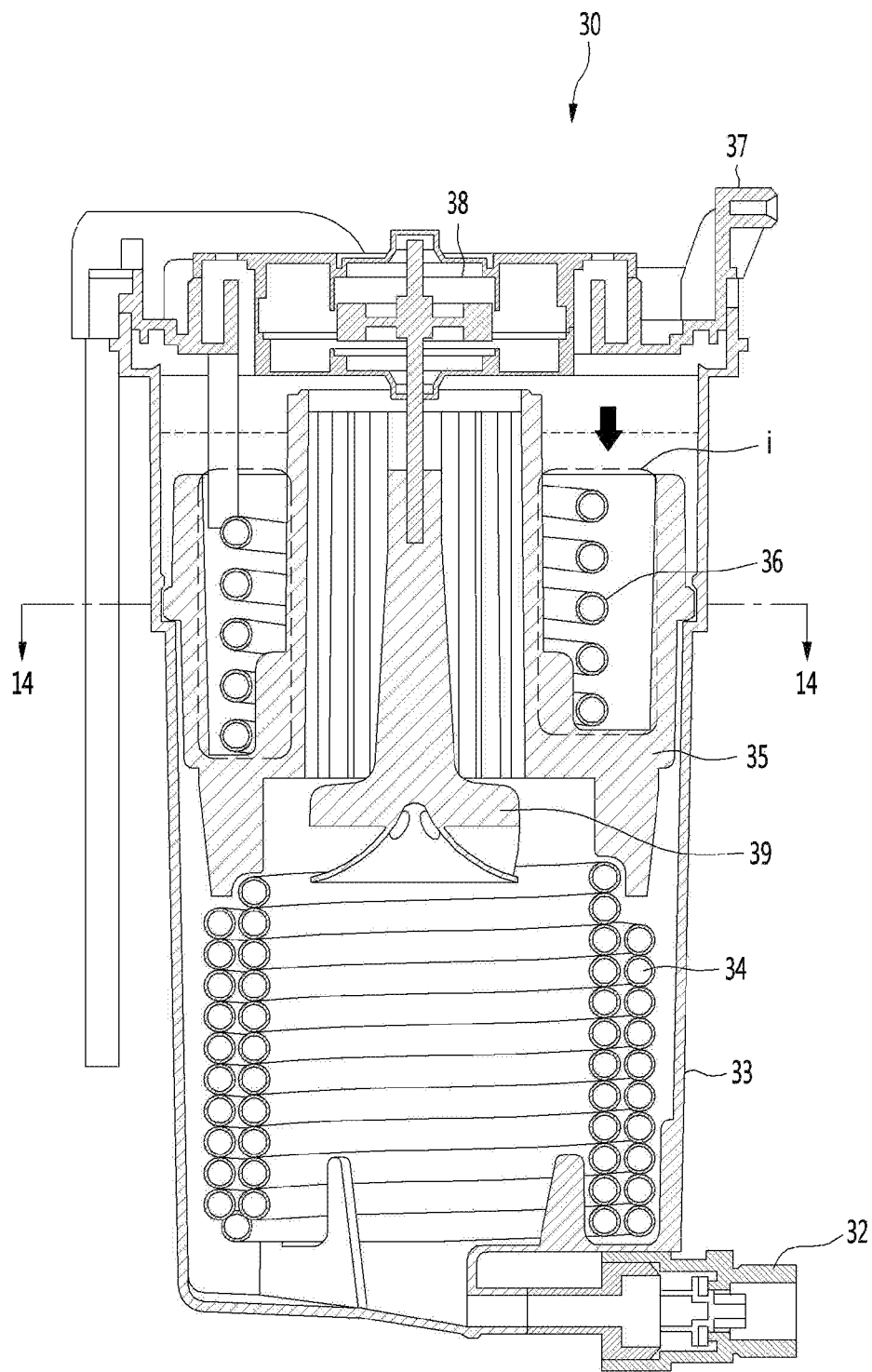
FIG. 12 is a longitudinal sectional view taken along line 12-12 of FIG. 4.
Figure 13:
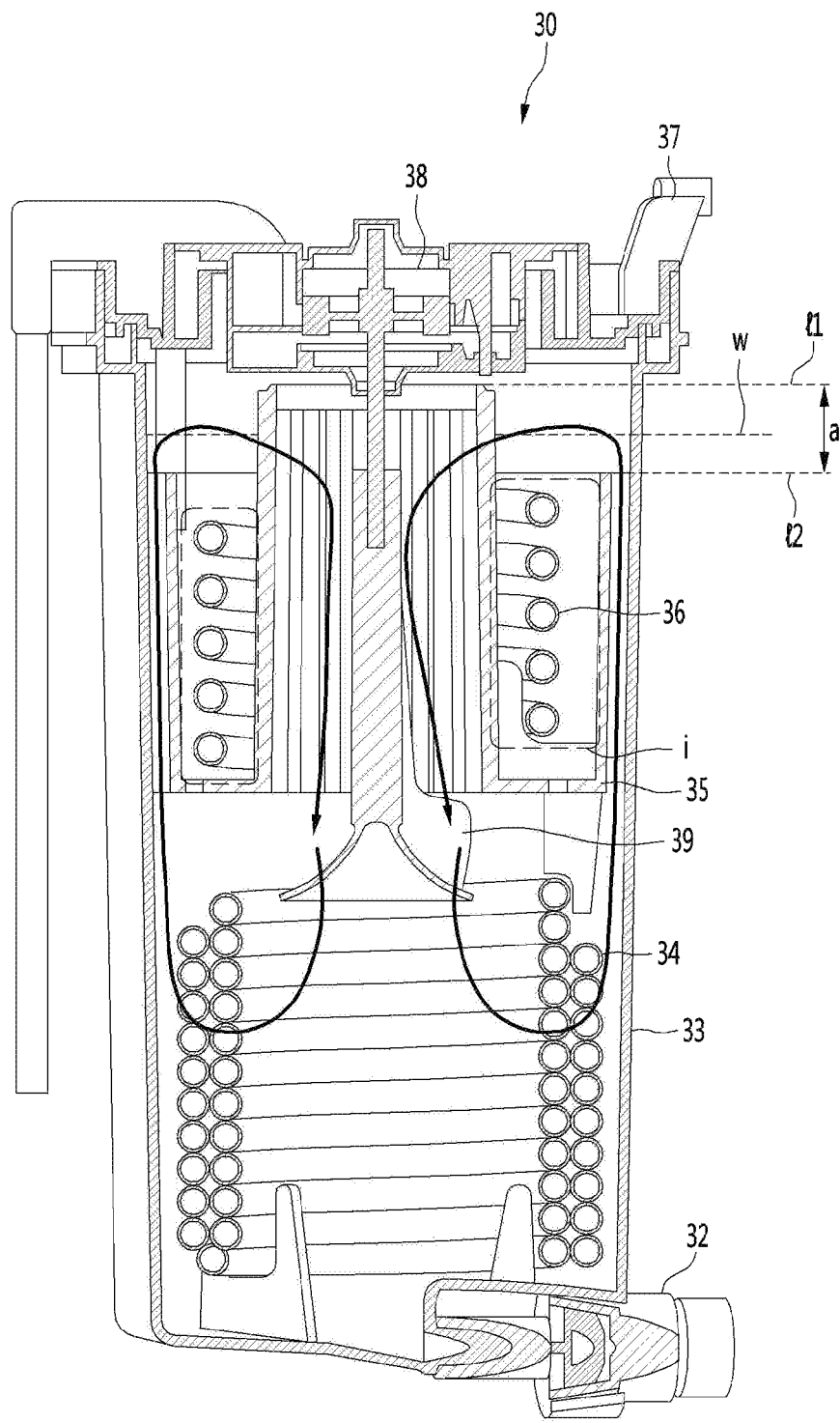
FIG. 13 is a longitudinal sectional view taken along line 13-13 of FIG. 4.
Figure 14:
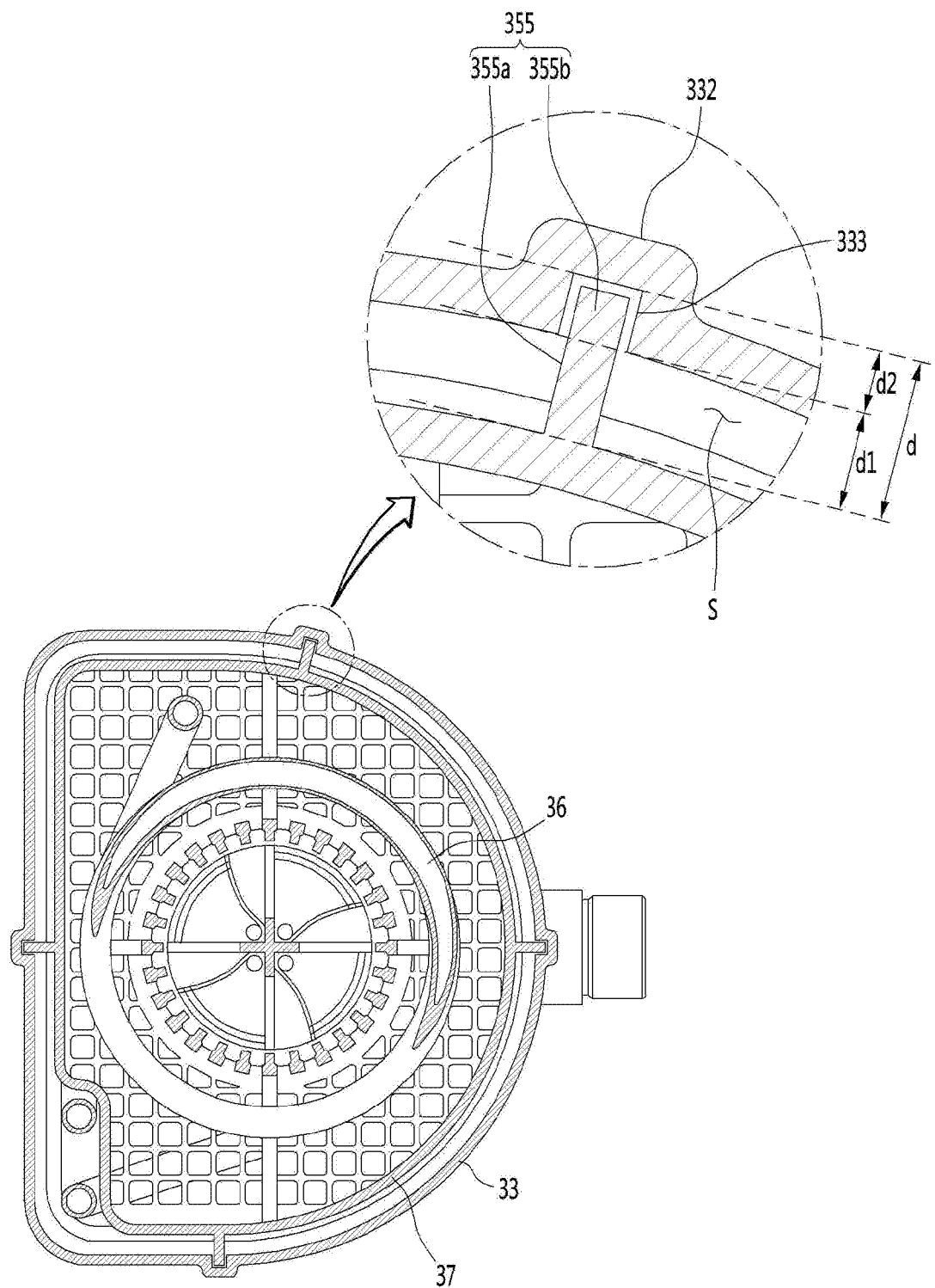
FIG. 14 is a cross-sectional view taken along line 14-14 of FIG. 12.

FIG. 12 is a longitudinal sectional view taken along line 12-12 of FIG. 4, FIG. 13 is a longitudinal sectional view taken along line 13-13 of FIG. 4, and FIG. 14 is a cross-sectional view taken along line 14-14 of FIG. 12. For reference, FIGS. 12 and 13 are longitudinal sectional views showing a state in which the insulation case 31 and the insulation cover 40 are removed.

Referring to FIGS. 12 to 14, when the assembling of the cold water generating unit 30 is completed, the upper surface of the outer wall portion 352 constituting the partition member 35 is lower than the upper surface of the inner wall portion 353.

In detail, a water level w of the cooling water is formed to be lower than a horizontal plane a2 passing through the upper surface of the outer wall portion 352 and lower than a horizontal plane a1 passing through the upper surface of the inner wall portion 353. When the agitator 39 rotates, as indicated an arrow in FIG. 13, the cooling water in the lower space in which the cold water pipe 34 is accommodated rises along the passage formed between the outer wall portion 352 and the cooling water tank 33. The rising cooling water rides over the outer wall portion 352 and falls into the upper space, that is, the evaporator accommodation portion 357, and the cooling water falling into the evaporator accommodation portion 357 passes through the inner wall portion 353 and returns to the lower space.

When the water level w of the cooling water is lower than the upper surface of the outer wall portion 352, the flow of the cooling water may not be achieved due to the outer wall portion 352.

In addition, the water level w of the cooling water may be lower than the upper surface of the inner wall portion 353. When the water level w of the cooling water is equal to or higher than the upper surface of the inner wall portion 353, ice i formed on the surface of the evaporator may be grown up to the upper end of the inner wall portion 353, thereby interrupting the circulation of the cooling water.

For these reasons, it is preferable that the upper surface of the inner wall portion 353 is formed to be higher than the upper surface of the outer wall portion 352 by a predetermined length a, and the cooling water is formed on the upper surface of the inner wall portion 353 and the upper surface of the outer wall portion 352.

Referring to FIG. 14, a horizontal length d of the mounting guide 355 may be defined as the sum of a length d1 of the spacing rib 353a and a length d2 of the fixing rib 353b. A spacing space is formed between the outer wall portion 352 and the side wall of the cooling water tank 33 and can be defined as a cooling water rising space S. A width of the cooling water rising space S corresponds to a protruding length d1 of the spacing rib 353a.

As described above, since the outer wall portion 352 is formed in the region where the evaporator 36 is mounted and the outer wall portion 352 is separated from the wall surface of the cooling water tank 33, it is possible to prevent the ice formed around the evaporator 36 from directly contacting the wall surface of the cooling water tank 33.

The invention claimed is:

1. A water purifier comprising:
a cooling water tank storing cooling water;
a partition member mounted inside the cooling water tank and partitioning an inner space of the cooling water tank into an upper space and a lower space;
a cold water pipe which is accommodated in the lower space and through which edible water flows;
an evaporator which is accommodated in the upper space and through which a refrigerant flows; and
an agitator penetrating the partition member and disposed in the lower space so as to stir the cooling water,
wherein the partition member comprises:
a bottom portion on which the evaporator is mounted, the bottom portion having a plurality of cooling water through-holes formed therein; and
an outer wall portion extending upward along an edge of the bottom portion to form an evaporator accommodating portion, wherein the outer wall portion is spaced apart from an inner wall of the cooling water tank so as to prevent ice formed in the evaporator accommodating portion from being in contact with the inner wall of the cooling water tank.

2. The water purifier according to claim 1, further comprising a mounting guide extending from an outer circumferential surface of the outer wall portion and fixed to the inner wall of the cooling water tank such that the outer wall portion is spaced apart from the inner wall of the cooling water tank.

3. The water purifier according to claim 2, wherein the mounting guide comprises a fixing rib extending from the outer wall portion, and
wherein a fitting groove into which the fixing rib is inserted is formed in the inner wall of the cooling water tank.

4. The water purifier according to claim 3, wherein the fitting groove is defined by a guide protrusion protruding from the outer wall portion of the cooling water tank, the guide protrusion being formed in such a manner that a portion of the cooling water tank is rounded or bent a plurality of times.

5. The water purifier according to claim 4, wherein the fitting groove and the guide protrusion extend downward from an upper end of the cooling water tank by a predetermined length, and
wherein, when the partition member is mounted inside the cooling water tank, the fixing rib is caught at a lower end of the fitting groove.

6. The water purifier according to claim 4, further comprising an insulation case accommodating the cooling water tank,
wherein a mounting guide groove into which the guide protrusion is inserted is formed in an inner wall of the insulation case is provided with.

7. The water purifier according to claim 2, wherein the mounting guide comprises:
a spacing rib extending from the outer wall portion and contacting the inner wall of the cooling water tank; and
a fixing rib further extending from an end of the spacing rib,
wherein a fitting groove into which the fixing rib is inserted is formed in the inner wall of the cooling water tank.

8. The water purifier according to claim 7, wherein the fitting groove is defined by a guide protrusion protruding from the outer wall portion of the cooling water tank, the guide protrusion being formed in such a manner that a portion of the cooling water tank is rounded or bent a plurality of times.

9. The water purifier according to claim 8, wherein the fitting groove and the guide protrusion extend downward from an upper end of the cooling water tank by a predetermined length, and
wherein, when the partition member is mounted inside the cooling water tank, the fixing rib is caught at a lower end of the fitting groove.

10. The water purifier according to claim 8, further comprising an insulation case accommodating the cooling water tank,
wherein a mounting guide groove into which the guide protrusion is inserted is formed in an inner wall of the insulation case is provided with.

11. The water purifier according to claim 1, wherein a stepped portion for forming a space through which an inflow end portion and a discharge end portion of the cold water pipe pass is formed at a position of the outer wall portion.

12. The water purifier according to claim 1, wherein the partition member further comprises an inner wall portion extending upward from an edge of an agitator through-hole formed inside the bottom portion, and
an upper end of the inner wall portion is formed higher than an upper end of the outer wall portion.

13. The water purifier according to claim 12, wherein the cooling water is filled up to a height corresponding to the upper end of the inner wall portion and the upper end of the outer wall portion.

14. The water purifier according to claim 12, wherein the inner wall portion comprises:
a plurality of vertical ribs extending upward from the bottom portion and arranged in a circumferential direction of the agitator through-hole; and
an upper rib connecting the plurality of vertical ribs at upper ends of the plurality of vertical ribs.

15. The water purifier according to claim 12, further comprising:
a plurality of evaporator support ribs extending upward from an upper surface of the bottom portion and supporting the evaporator; and
a plurality of cold water pipe support ribs extending downward from a lower surface of the bottom portion to support an upper surface of the cold water pipe.

* * * * *